April 23, 1963
C. W. SKARSTROM ET AL
3,086,339
TECHNIQUE WITH THE FRACTIONATION OR SEPARATION OF
COMPONENTS IN A GASEOUS FEED STREAM
Filed June 9, 1960
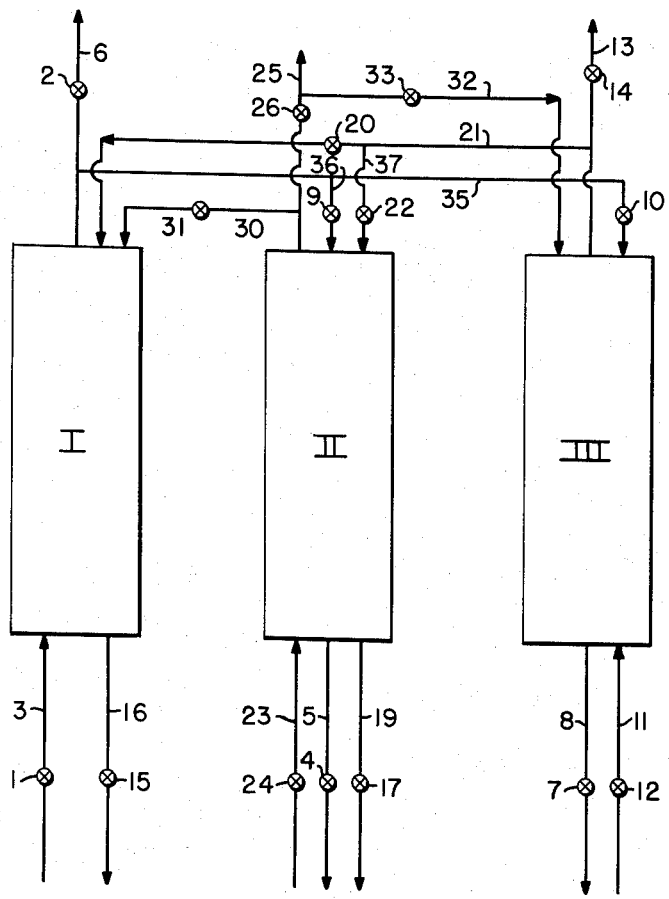
Charles W. Skarstrom
William O. Heilman  Inventors
By W. O. Heilman
Patent Attorney 3,086,339
Patented Apr. 23, 1963

3,086,339
TECHNIQUE WITH THE FRACTIONATION OR SEPARATION OF COMPONENTS IN A GASEOUS FEED STREAM
Charles W. Skarstrom, Montvale, and William O. Heilman, Short Hills, N.J., assignors to Esso Research and Engineering Company, a corporation of Delaware
Filed June 9, 1960, Ser. No. 34,940
3 Claims. (Cl. 55—26)

The present invention is concerned with an improved technique and apparatus for removing one or more key components from a gaseous mixture or gas stream containing such components. The present invention, in essence, utilizes the heatless separation technique taught in copending application, Serial No. 714,780, filed February 12, 1958, inventor, Charles W. Skarstrom, entitled "Method and Apparatus for Fractionating Gaseous Mixtures," U.S. Patent 2,944,627, issued July 12, 1960. In essence, the present invention utilizes the fractionating technique taught in this identified application and extends the technique by utilizing at least three separation zones which are cyclically operated in a manner that the pressure on each zone is cyclically reduced so as to secure an improved method for the separation of various components.

In various industrial processes, moisture-free or oxygen- or nitrogen-rich air streams are essential to proper operating procedures. Many methods and a variation of apparatus combinations are known or have been proposed to obtain such ends. Most involve either complicated procedures or equipment expensive to assemble and operate. It is an object of the present invention to provide a simple method and apparatus which, with minor modification, may be employed in a multitude of situations where the purification or concentration or separation of various constituents from gaseous mixtures is desired. Specifically, the objects of the present invention may be stated as follows:

(1) To provide a separation system such as an adsorption system or diffusion system for the drying of air or other gaseous materials, without need for employment of extraneous heat to restore the adsorbent used in the system.

(2) To provide such a system, wherein relatively small amounts of adsorbent material are required for efficient operation, and therefore, wherein expenditures for equipment are considerably reduced.

(3) To provide a method and apparatus whereby oxygen and/or nitrogen-rich products may be recovered from atmospheric air without liquefaction or other expensive or complicated procedures.

(4) To provide a method and apparatus whereby a gaseous mixture may be fractionated to provide a series of effluent product streams in which each such effluent stream is rich in at least one component portion of the gas mixture supplied to the system as a feed material.

The terms "gas" and "gaseous" as employed in the following description or claims are intended to include not only materials that are conventionally considered to be gases, but also those materials conventionally considered to be vapors.

The process of the present invention may be readily understood by reference to the drawing illustrating a general embodiment of the same. The description of the drawing is with respect to the following timing and pressure conditions in the zones.

| Zones | Pressures of Zones, lbs. absolute | |
|---|---|---|
| I | 60 | To go on adsorption. |
| II | 60 | To go on desorption to 30 lbs. |
| III | 30 | To go on desorption to 15 lbs. |

At the start of the cycle, all valves are closed, and during the first third of the cycle, the following occurs. Valves 1 and 2 open. A feed comprising composition A, B and C passes through line 3 at zone I pressure. Compositions A and B are adsorbed at 60 lbs. on a suitable selected adsorbent. Composition C comprises an effluent passing through valve 2 and line 6, and may be utilized as desired.

Simultaneously with the opening of valves 1 and 2, valve 4 opens, permitting zone II to drop to a pressure of 30 lbs. An effluent is dumped from zone II through line 5. Under the conditions of operation, B desorbs at 30 lbs. and passes through line 5 as the effluent. A is retained on adsorbent within zone II at 30 lbs.

Simultaneously with the opening of valves 1, 2 and 4, valve 7 in zone III opens, permitting zone III to drop to 15 lbs. and thus desorb composition A which comprises the effluent passing through line 8. Therefore, at start of the cycle, compositions A, B and C enter zone I through line 3. Composition C comprises the effluent from zone I passing through line 6. Composition B comprises the effluent from zone II passing through line 5, while composition A comprises the effluent removed from zone III through line 8.

Thus, at the start of the cycle (stage I or dump stage), an increasing concentration gradient of A and B advances progressively upwardly on the adsorbent in zone I. A decreasing concentration gradient of B on the adsorbent advances downwardly through zone II. A decreasing concentration gradient of A advances downwardly on the adsorbent in zone III.

When zone II reaches 30 lbs. prior to breakthrough of either A or B in zone I, and there is substantially no flow through line 5, and when zone III reaches 15 lbs., and there is substantially no flow of A through line 8, stage II, or the backwash stage starts. At this point, valve 9 opens, permitting backwash of composition C through zone II whereby composition B is substantially completely removed from zone II. Prior to breakthrough of any substantial amount of C, the backwash stage is discontinued in zone II by closing valves 4 and 9.

Simultaneously zone III is in backwash with zone II by opening valve 10, permitting composition C to backflow or backwash through zone III, thereby substantially completely removing composition A from zone III. Prior to breakthrough of composition C through line 8, the backwash stage in zone III is discontinued by the closing of valve 7.

The repressuring on stage III of the first third of the cycle is started by closing valves 4, 7 and 9, permitting valve 10 to remain open, thereby causing the pressure to build up in zone III to the operating adsorption high pressure of approximately 60 lbs. When the pressure in zone III reaches this level, valve 10 closes and zone III is ready to go on adsorption, zone I to go intermediate desorption and zone II to go on final desorption. This operation constitutes the intermediate or middle third of the cycle. During the first third of the cycle, zone I on adsorption has reached substantial saturation of the adsorbent with respect to a composition comprising A and B, and as mentioned, it ready to go on intermediate desorption.

It is to be understood that by proper manifolding of line 5, pure composition B produced during stage I may be segregated from the composition produced during stage II, which may contain a slight amount of composition C. It is also to be understood by proper manifolding the gaseous effluent A, passing through line 8 in stage I may be segregated from composition A produced during stage II, which may contain a small concentration of composition C.

At the expiration of the first third of the cycle, zones I and III are at 60 lbs. pressure and zone II at 30 lbs. pressure. The adsorbent in zone I is substantially saturated with composition comprising A and B, the adsorbent in zone II contains composition comprising A, whereas, the adsorbent in zone III is substantially free of any component comprising A, B and C.

For clarity of description, different lines are shown in the drawing to pass the composition into and out of the respective zones during the respective stages of each third of the cycle. It is to be understood that in operation by proper valving and manifolding, the lines may be utilized both as an effluent line for the respective gases and as a feed line, thereby eliminating certain lines.

At the start of the intermediate or middle third of the cycle all valves are closed except as hereinafter described. A feed gas comprising compositions A, B and C is introduced into zone III through line 11 and opens valve 12. The effluent comprising composition C is withdrawn from the top of zone III through line 13 and opens valve 14. Also as pointed out, all valves, including valves 1 and 2, are closed as well as valves 4, 9, 7 and 10. At the start of the middle third of the cycle, valve 15 opens in a manner to permit the pressure in zone I to drop to about 30 lbs., thereby allowing composition B to pass through line 16. Valve 17 opens in zone II to drop the pressure to about 15 lbs., thereby permitting A to pass through line 19. This constitutes the dump stage I of the middle third of the cycle.

When the pressure in zone I is about 30 lbs., and when the pressure in zone II is about 15 lbs., and there exists substantially no flow of B through line 16 and no flow of A through line 19, then a portion of composition C is introduced into the top of zone I by means of valve 20 and line 21. A portion of C is also introduced into the top of zone II by means of line 21 and valve 22. This constitutes the backwash stage of the middle third cycle. Thus, the effluent removed from the bottom of zone I by means of line 16 will comprise composition B, then composition B with a small amount of C. The composition removed from zone II at this point will comprise composition A.

At this point, the pressure in zone I will be approximately 30 lbs., the pressure in zone II, approximately 15 lbs., and the composition in zone III approximately 60 lbs. When a trace of composition C appears with composition A, the flow of C through zone II is discontinued by closing valve 17. When composition B from zone I shows some composition C, then valves 15 and 20 are closed. During the third stage of the middle third cycle, the pressure in zone II is raised to about 60 lbs. and valve 22 then closed.

At this point, the adsorbent in zone III will be substantially saturated with compositions A and B, the adsorbent in zone II substantially free of constituents A, B and C, and the adsorbent in zone I is substantially saturated with composition A.

At this point, all valves are closed except as hereinafter described. Feed in the last third of the cycle comprising compositions A, B and C is introduced into the bottom of zone II through line 23 and open valve 24. Composition C is removed from zone II by line 25 through open valve 26. Simultaneously, valve 7 in zone III is opened to permit the pressure to drop to about 30 lbs. Under these conditions, an effluent passes through valve 7 and line 8 which comprises B. Valve 15 is opened in zone I, permitting the pressure to drop to about 15 lbs. The effluent passes through line 16 and comprises composition A. This constitutes the stage I of the first third cycle.

When the pressure in zone I drops to about 15 lbs., and when the pressure in zone III drops to about 30 lbs., and there is substantially no flow through lines 16 and 8, a portion of C removed by means of line 25 is passed into the top of zone I, through line 30 and valve 31. A portion of C is also introduced into the top of zone III via line 32 and valve 33. This comprises the stage II of the final third cycle.

Thus, the effluent initially removed from the bottom of zone I via line 16 will comprise composition A. The composition removed from the bottom of zone III via line 8 will comprise B. When composition C appears in A or B, valves 7 and 15 are closed as well as valve 32. The pressure in the stage III of the final third cycle in zone I is brought up to about 60 lbs. to complete the entire cycle, which is then repeated as hereinbefore described.

The foregoing description may be more fully understood by the following tabulation as to the pressures and effluent during the various stages in each third of the cycle:

*Pressures*

| Cycle | Stage | | Zones | | | | | |
|---|---|---|---|---|---|---|---|---|
| | | | I | Effluent | II | Effluent | III | Effluent |
| First Third Cycle | I (Dump) | Start<br>End | 60<br>60 | }C | 60<br>30 | }B | 30<br>15 | }A |
| | II (Backwash) | Start<br>End | 60<br>60 | }C | 30<br>30 | }B* | 15<br>15 | }A* |
| | III (Repressure) | Start<br>End | 60<br>60 | }C | 30<br>30 | }------ | 15<br>60 | }-------- |
| Intermediate Third Cycle | I (Dump) | Start<br>End | 60<br>30 | }B | 30<br>15 | }A | 60<br>60 | }C |
| | II (Backwash) | Start<br>End | 30<br>30 | }B* | 15<br>15 | }A* | 60<br>60 | }C |
| | III (Repressure) | Start<br>End | 30<br>30 | }------ | 15<br>60 | }------ | 60<br>60 | }C |
| Final Third Cycle | I (Dump) | Start<br>End | 30<br>15 | }A | 60<br>60 | }C | 60<br>30 | }B |
| | II (Backwash) | Start<br>End | 15<br>15 | }A | 60<br>60 | }C | 30<br>30 | }B |
| | III (Repressure) | Start<br>End | 15<br>60 | }------ | 60<br>60 | }C | 30<br>30 | }-------- |

A* B* = A or B plus trace of C.

Depending upon the operation contemplated, the adsorbent employed may be selected from such materials as activated carbon, alumina, silica gel, glass wool, adsorbent cotton, and even soft tissue paper. Various metal oxides, clays, fuller's earth, bone char, etc. also have adsorbent characteristics which may be utilized according to the present invention. Still another adsorbent material of the character contemplated is one known as Mobilbeads, which is a siliceous moisture adsorbing compound.

Other adsorbent materials suitable for employment according to the present invention include materials known as molecular sieves. This class of materials includes certain zeolites, both naturally-occurring and synthetic, which have crystalline structures containing a large number of small cavities interconnected by a number of still smaller holes or pores, the latter being of exceptional uniform size. The pores may vary in diameter from 3 to 5 Angstrom units, to 12 to 15 or more. For a particular molecular sieve material, however, the pore sizes are substantially uniform and accordingly the material normally will be designated by the characteristic size of its pores.

In the preferred practice of the method, according to the present invention, a stream of a gaseous mixture under positive pressure is passed, cyclically and in alternating sequence, through at least three adsorption zones, the ambient atmosphere of the zones being substantially maintained at a temperature such as to maintain the feed material and the effluent products in a vapor or gas phase. The stream introduced into each zone is passed over and through a body of an adsorbent contained in the zone, which adsorbent material has a selective affinity for at least one key component portion of the mixture. During passage of the original feed stream of the mixture through a zone, the zone is on an adsorption cycle. During this cycle, the zone is maintained at substantially the pressure of the original feed stream introduced thereinto. After passage through the zone, a gaseous effluent product is discharged from the zone under substantially the pressure of the initial stream.

When one of the zones is on adsorption, pressures on the other zones are reduced. The pressure may be reduced by any suitable means. One great advantage of the present process is the conservation of heat evolved on the adsorption cycle. Processes heretofore known in the art conducted the adsorption cycle for a period sufficient to raise the temperature appreciably, thereby permitting or causing heat to flow through the bed and be lost through the walls of the adsorption cycle.

In accordance with the present invention wherein rapid cycling is employed between the adsorption and the desorption phases, the delta T on the adsorption zone is relatively small. This tends to greatly reduce the flow of heat. Due to the short time on the adsorption cycle, heat will not have time to flow through the bed, and through the walls of the vessel into the surrounding atmosphere. By rapid cycling from adsorption to desorption in the respective zones, the desorption cycle will substantially completely utilize the heat produced during the adsorption cycle. As pointed out above, this is due to the low delta T attained, and due to the lack of time for dissipation of the heat of adsorption. In effect, the beds function as highly efficient, rapidly cycled, bead heat exchangers. Generally, the time on the adsorption cycle in accordance with the present invention does not exceed 2–3 minutes and is preferably less than one minute. A very desirable time on the adsorption cycle is less than 20 seconds as, for example, 10 seconds. The particular times utilized depend upon various factors, such as the particular adsorbent utilized, the height of the bed, the nature of the key component and other operating variables.

The combination of temperature and reduced pressure, plus the flushing or scavenging effect of the backwash prepares the adsorbent to adsorb the component or components from the stream of the gaseous mixture introduced during the next adsorption cycle for this zone. In effect, the desorption step, accomplished in one zone involves a backwashing action by the effluent product withdrawn from the adsorption cycle.

While the operation has been described utilizing three zones employing a high adsorption pressure, an intermediate partial desorption pressure and a low full desorption pressure, it is to be understood that additional zones operated in a similar manner may be utilized. For example, four zones may be employed utilizing a high adsorption pressure in one zone, a high intermediate partial desorption pressure in a second zone, a low intermediate pressure for more desorption in a third zone, and a low pressure for complete desorption in the fourth zone.

Also, while the description with respect to the drawing has been that the respective stages in each third of the cycle substantially coincide, it is to be understood that these stages may be somewhat varied. However, in general, it is preferred that if three zones are utilized, the start of each third of the cycle with respect to each zone coincide, and similarly, if four zones are utilized, that the start of each quarter cycle coincide with regard to the respective zones. The timing of the valves may be controlled by an electric solenoid timing control or other type of equivalent program timing.

A specific operation for the segregation of a gaseous mixture comprises the segregation of hydrogen, of methane and of toluene. When this mixture is passed through a zone containing activated carbon at 60 lbs. pressure, the carbon will adsorb the methane and the toluene, allowing the hydrogen to pass through. The intermediate zone operated at about atmospheric pressure will retain the toluene and will permit the desorption of the methane which is segregated. The low pressure zone operated at about 1 lb. absolute pressure will desorb the toluene in a manner as described above. The respective zones are cyclically operated as described.

While it is preferred to use at least three zones wherein one zone is on adsorption and the remaining zones are on partial or complete desorption, under certain circumstances and conditions, only two zones may be utilized. Under this mode of operation, one zone will be on adsorption, while the other zone will be on staged desorption. The desorption cycle will be operated wherein the pressure on the zone undergoing desorption will, for instance, be reduced to an intermediate pressure and maintained at this pressure for a time sufficient to desorb the composition which will be desorbed at this pressure. At the intermediate pressure, the desorbent will be backwashed with effluent from the zone under adsorption. The zone under desorption will then be reduced to a relatively low pressure wherein full desorption will occur.

What is claimed is:

1. In an operation wherein at least three adsorption zones are used and wherein a feed gas mixture is cyclically introduced into one end of each of the respective adsorption zones, the improved process for the segregation of various components from said gas mixture which comprises utilizing suitable adsorbents in the respective zones and introducing said gas mixture into one end of an initial zone on the adsorption phase, which initial zone is maintained at a relatively high pressure under conditions whereby a plurality of components will be adsorbed on said adsorbent therein and at least one component of said feed mixture passes through said initial zone unadsorbed and is withdrawn from said initial zone at the other end thereof, maintaining the remaining zones on the desorption phase at lower and different pressures and removing different adsorbed components from said adsorbent therein counterflow to the direction of the feed, continuing the phase until said initial zone is saturated to a predetermined extent with said adsorbed components and until said other zones are desorbed to a predetermined extent of said adsorbed components, thereafter introducing said feed into said zone of lowest pressure and progressively lowering said initial zone in stages to said lowest pressure and maintaining the time length of the phase so as to substantially balance the heat of adsorption and desorption within said zones, operating said zone of lowest pressure on a desorption-repressuring phase for a time period substantially equivalent to the time period of the zone on the adsorption phase, and operating said zone of lowest pressure on said desorption-repressuring phase in a first step of reducing the pressure so as to permit adsorbed components to be removed therefrom, then in a second step backwashing with said unadsorbed components from the zone on the adsorption phase, then in a final step building up the pressure in said zone of lowest pressure to said relatively high pressure in the zone on the adsorption phase, and thereafter cyclically continuing the operation.

2. In an operation wherein three adsorption zones are utilized and wherein a feed gas mixture is cyclically introduced into one end of each of the respective adsorption zones, the improved process for the segregation of components from a gaseous mixture which comprises introducing a feed mixture containing said components into an initial zone on an adsorption phase and maintained at a relatively high pressure, maintaining a secondary zone on a desorption phase and at an intermediate pressure and desorbing a component from said adsorbent therein counterflow to said mixture, maintaining the tertiary zone on a desorption phase and at a relatively low pressure and desorbing a component from said adsorbent therein counterflow to said feed mixture, continuing the cycle until the adsorbent in said initial zone becomes saturated to a predetermined degree with components and wherein said secondary and tertiary zones become desorbed to a predetermined degree of said components, thereafter introducing the feed into said tertiary zone at said relatively high pressure, reducing the pressure in said secondary zone to said relatively low pressure and reducing the pressure in said initial zone to said intermediate pressure, continuing the cycle until the adsorbent in said tertiary zone becomes saturated to a predetermined degree and said adsorbent in said secondary and said tertiary zones become desorbed to a predetermined degree, thereafter introducing said feed into said secondary zone at said relatively high pressure, reducing the pressure on said initial zone to said relatively low pressure, reducing the pressure in said tertiary zone to said intermediate pressure, continuing the cycle for a time period so that the heats of adsorption and desorption are substantially balanced within said zones, operating said zone of said relatively low pressure on a desorption repressuring phase for a time period substantially equivalent to the time period of said zone at relatively high pressure on said adsorption phase and operating said zone of lowest pressure in a first step of reducing pressure so as to permit adsorbed components to be removed therefrom, thereafter in a second step backwashing with said unadsorbed components from said zone at relatively high pressure, thereafter building up the pressure on said zone of said relatively low pressure to said relatively high pressure and thereafter continuing the cycle.

3. Process as defined by claim 2 wherein said adsorbent comprises activated charcoal, wherein said gaseous mixture comprises hydrogen, methane and toluene, wherein said high pressure is about 60 lbs., wherein said intermediate pressure is about 15 lbs., and wherein said lowest pressure is about 1 lb. absolute.

References Cited in the file of this patent
UNITED STATES PATENTS

| | | |
|---|---|---|
| 1,617,305 | Guyer et al. | Feb. 8, 1927 |
| 1,836,659 | Gordon | Dec. 15, 1931 |
| 2,254,799 | Erdmann | Sept. 2, 1941 |
| 2,398,817 | Turner | Apr. 23, 1946 |
| 2,918,140 | Brooks | Dec. 22, 1959 |
| 2,944,627 | Skarstrom | July 12, 1960 |